Oct. 6, 1953
M. L. BARNHART
2,654,155
APPARATUS FOR MEASURING SUSPENDED
PIPE SECTIONS UPON DERRICKS
Filed Oct. 15, 1951
2 Sheets-Sheet 1
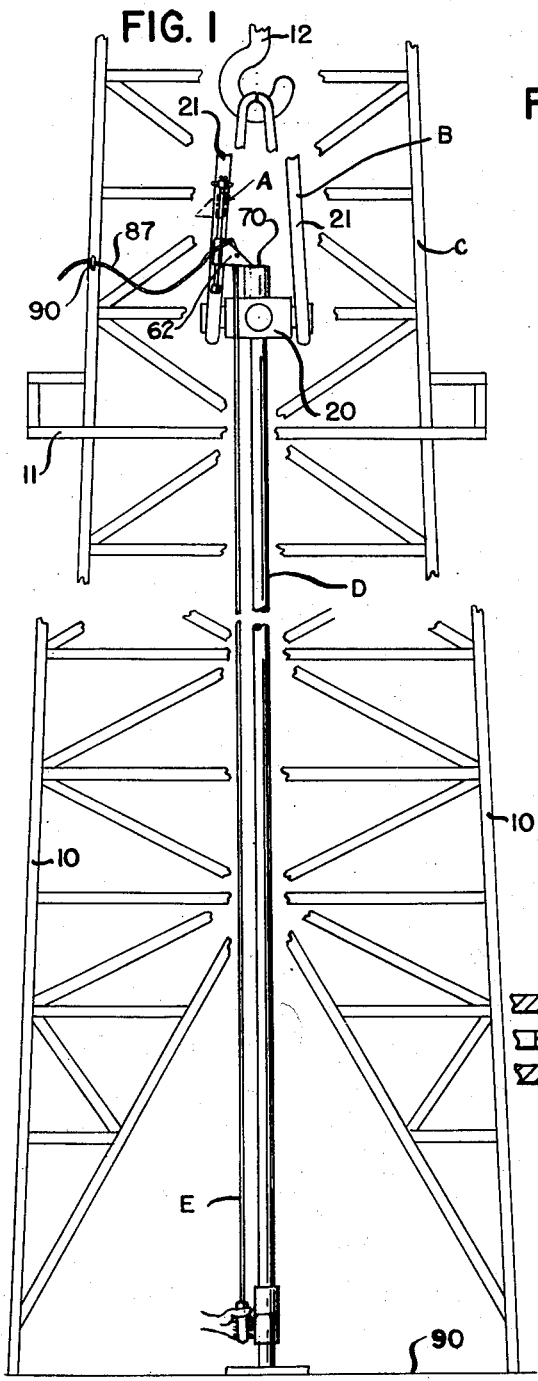
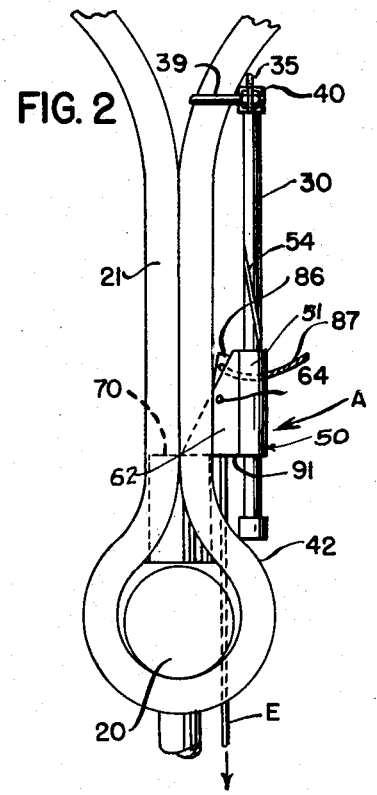
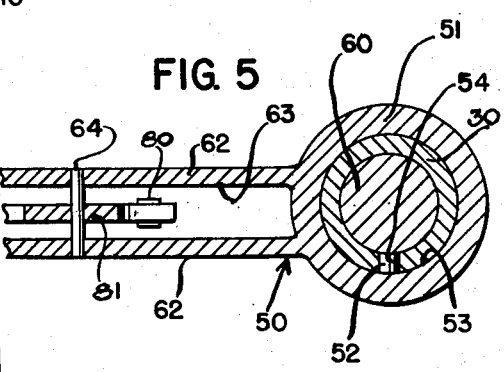
Inventor
Mearl L. Barnhart
Attorneys

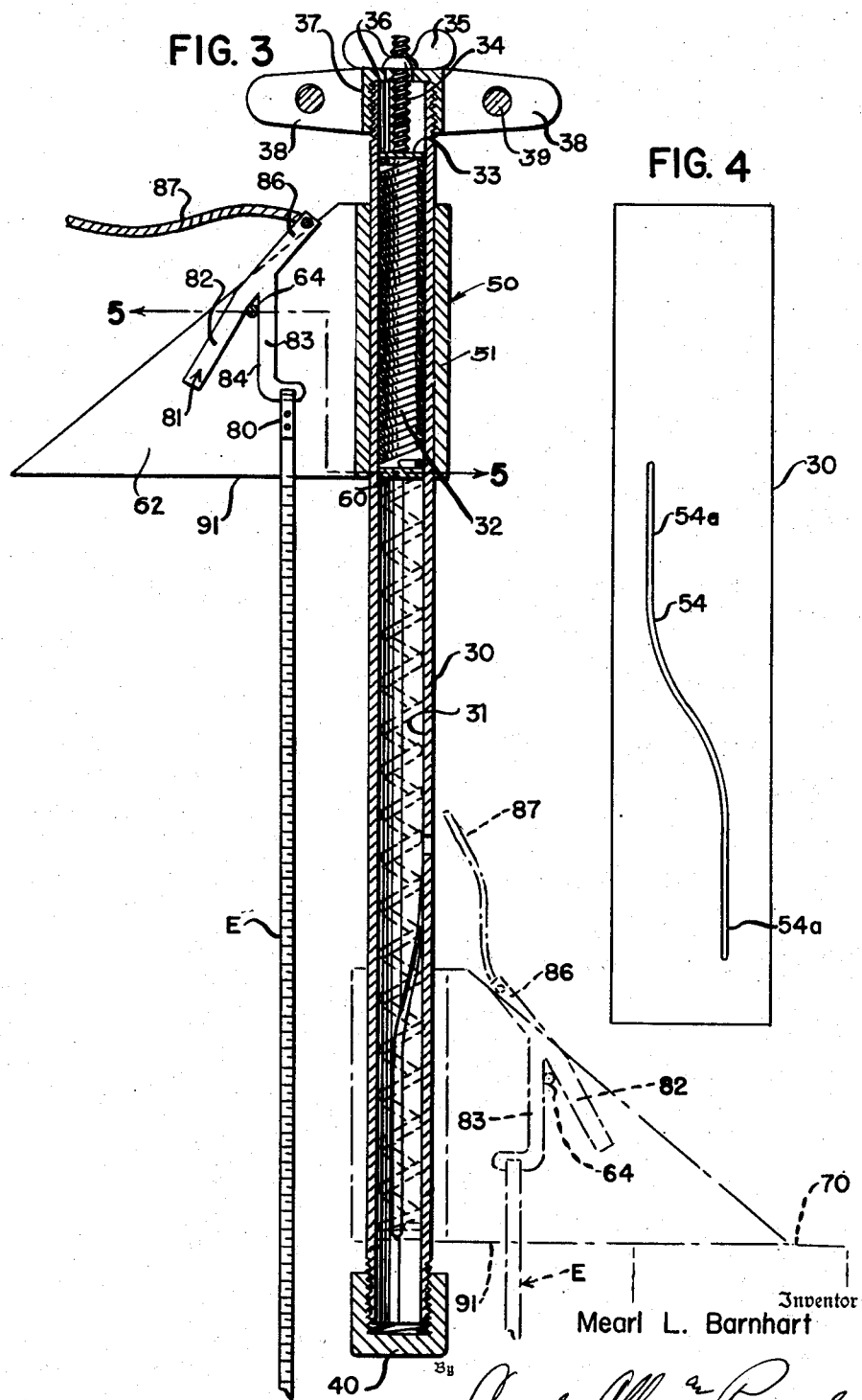

Patented Oct. 6, 1953

2,654,155

UNITED STATES PATENT OFFICE 2,654,155

APPARATUS FOR MEASURING SUSPENDED PIPE SECTIONS UPON DERRICKS

Mearl L. Barnhart, Vincent, Tex.

Application October 15, 1951, Serial No. 251,389

7 Claims. (Cl. 33—137)

This invention relates to improvements in means for measuring lengths of oil well pipe or tubing.

It is well understood in the oil well art that tubing stretch of the string of pipe is a serious consideration in determining bit location. For this and other reasons it is desirable to know the length of each individual pipe section while under stretch. It is therefore a purpose of this invention to provide a relatively simple, practical and efficient device for actually measuring pipe lengths while supported above ground, under stretch, by the well derrick and elevator mechanism.

It is a further object of this invention to provide an improved apparatus for measuring pipe lengths under stretch in quick and easy manner, requiring but little attention upon the part of the derrick-man.

Other objects and advantages of this invention will be apparent during the course of the following detailed description.

In the accompanying drawings, forming a part of this specification, and wherein similar reference characters designate corresponding parts throughout the several views:

Figure 1 is a fragmentary view of a derrick and its elevator mechanism, showing the same supporting a section or length of pipe or tubing; the improved device for measuring the pipe section being shown associated with the derrick and elevator mechanism and in accurate position for measuring the pipe.

Figure 2 is a fragmentary view of an elevator link showing the improved measuring device associated therewith and in measuring position with respect to the pipe length.

Figure 3 is a vertical cross section view taken through the measuring device showing in full lines the tape and its associated mechanism in an up position, and in dot and dash lines the same details in the down position for pipe measuring purposes.

Figure 4 is a developed view showing a detail of the measuring mechanism, and more particularly a slot for guiding the rotational movement of the tape supporting element.

Figure 5 is an enlarged cross sectional view taken substantially on the line 5—5 of Figure 3.

In the drawings, wherein for the purpose of illustration is shown a preferred embodiment of the invention, the letter A may generally designate the improved pipe or tubing measuring device. It is associated upon elevator mechanism B of any desired nature, within an oil well derrick C for the measuring of the lengths of pipe or tubing D while under stretch.

The derrick C is of usual construction, including the supporting legs 10, derrick-man's platform 11 and superstructure (not shown) supporting cable elevating and lowering mechanism (not shown) having an elevator mechanism attaching hook 12.

The elevator mechanism B, for detachable connection with pipe and tubing for the lifting thereof while under stretch from the well, may assume varied forms. For the purposes of this invention the elevator mechanism may include the rotary elevator clamp 20 having links 21 extending upwardly therefrom, to which the hook 12 may be detachably connected.

The broad principle of the improved measuring device A is that of having the zero end of the tape under control of the derrick-man and in position so that he can conveniently hook and unhook the same with respect to the supporting portion of the device. The upper end of the tape is always kept adjacent to the derrick-man and he unlatches or unhooks it from the supporting device when the elevator links are to be opened for releasing the tubing section. The elevator mechanism of course is lowered for another length of pipe and when it is elevated to the position of the derrick-man he again hooks the zero end of the tape upon the supporting mechanism. This supporting mechanism is of such nature that the zero end of the tape is supported thereby in out of the way position with respect to the upper end of the pipe section, but when the floor-man pulls the tape the supporting mechanism will lower to the point where the zero delineation of the tape will lie flush with the top edge of the tubing section, in order that the floor-man can take an accurate reading of the length of the tubing while under stretch.

The specific details of this tape supporting mechanism consists of a tubular supporting casing 30 having a passageway 31 therein adapted to house a tension spring 32 therein. The upper end of the tension spring 32 is supported by means of a disc or other expedient 33 which may be welded thereto, and this disc 33 has a screw-threaded shank 34 extending upwardly axially through the passageway of the casing 30, and extending above the top thereof, where it receives a wing nut 35. The wing nut 35 is adapted to rest upon the top wall 36 of a cap-nut 37 threaded upon the upper end of the spring receiving casing 30. Adjusting the nut 35 will vary the tension upon the spring for purposes to be subsequently disclosed.

The cap-nut 37 is provided with lateral extensions 38, diametrically opposed thereon, which receive the legs of a U-bolt 39 having nuts 40 thereon, for the purpose of clamping the upper end of the supporting casing 30 with some portion of the elevator link, as shown in Figures 1 and 2 of the drawings. The lower end of the casing 30 may have a cap-nut 40 screw-threaded thereon, and this cap-nut, if so desired, may be similarly bolted to some portion of the elevator link, but it may either hang free or rest against the eye portion 42 of the elevator link 21, as shown in Figure 2, for stabilizing purposes.

A reciprocating and oscillating tape supporting member 50 is provided upon the casing 30. It includes a sleeve portion 51 slidable and rotatable upon the casing 30, externally thereof, and it has a radially extending pin 52 welded or otherwise secured internally thereto, and projecting inwardly from the inner surface of the passageway 53. This pin 52 extends into a slot 54 which is provided through the casing 30. The slot 54 for a portion of its length is spiral, and the degree of this spiral is preferably 180°, but may vary to suit. The upper and lower terminal ends 54ª of the spiral slot 54 may be straight and not spiraled upon the casing 30 as shown, if so desired. The pin 52 at its inner end is rigidly connected to the lower end of the spiral spring 32, preferably by means of a disc 60, which freely slides vertically within the passageway 31 of the supporting casing 30. The tape supporting member furthermore includes one or more lateral extensions 62. In the drawings two are shown and in the cross space 63 is disposed a tape supporting pin 64, shown in Figure 5. This pin 64 is spaced from the sleeve 51. The wings 62 may be of a length suitable to contact the upper edge 70 of the drill pipe tool joint of the tubing section, the length of which is being measured, when the supporting member 50 is in its down position, as shown in Figure 1. Also the extensions 62 may be of a length suitable to enable the derrick-man to attach and detach the tape E to the pin 64 supporting member 50.

The tape E may be of any desired length, and the upper end thereof is secured at 80 to a hook-shaped member 81 as shown in the drawings. It consists of divergent leg portions 82 and 83; the space 84 therebetween being adapted to receive the supporting pin 64, as shown in Figure 3. A top length portion 86 is provided, to which a string or rope 87 is attached; the rope 87 being adapted for positioning upon the derrick C in some convenient location, as by means of a hook or other retaining device 90, accessible to the derrick-man.

It is believed that the operation of the device will be apparent from the foregoing. The normal position of parts is shown in Figure 3, in full lines. The elevator mechanism B of course elevates the string of tubing until the pipe length D is in the position shown in Figure 1, with the connected tool joints at the lower end of the section D and the upper end of the next tubing section of the string, above the floor 90. The derrick-man places the hook 81 upon the pin 64 and the floor operator pulls the tape downwardly. This will move the sleeve 51 downwardly over the casing 30 and rotate it from the position shown in full lines in Figure 3, to the dot and dash position shown in Figure 3, which is the full line position shown in Figure 1. The rotation of the laterally extending wings 62 continues until the lower edges 91 contact the top edge 70 of the tool joint of the tubing section D, and at which time the operator upon the floor can take the proper reading. When this has been done the floor-man releases tension upon the tape and the spring 32 will move the parts to the full line position shown in Figure 3, and at which time the derrick-man disconnects the hook 81 and removes the tape from the position where it would otherwise interfere with detachment of the elevator parts. The elevator is then lowered for connection to another length of tubing and the cycle continues; the tabulation of the lengths of the various sections of tubing, while under stretch, giving an accurate length of the string, for purposes well understood in this art.

Various changes in the shape, size, and arrangement of parts may be made to the form of invention herein shown and described, without departing from the spirit of the invention or the scope of the following claims.

I claim:

1. Apparatus for measuring the length of a pipe tube comprising an elongated support, a tape, a tape position determining a member slidable and rotatable along said support, means to guide the rotational action of said member upon said support, spring means to urge the member to one position upon the support, and means to connect the tape to said member.

2. Apparatus for measuring the lengths of pipe tubing in an oil well derrick comprising an elongated tubular casing, a sleeve slidable along and exteriorly of said casing, means connecting said sleeve to the casing so that as it moves therealong it will rotate to a predetermined degree around said casing, means for detachably supporting a length of tape upon said sleeve, and means to control the position of said sleeve upon said casing.

3. Apparatus for measuring the lengths of pipe tubing in an oil well derrick comprising an elongated tubular casing, a sleeve slidable along and exteriorly of said casing, means connecting said sleeve to the casing so that as it moves therealong it will rotate to a predetermined degree around said casing, means for detachably supporting a length of tape upon said sleeve, and means to control the position of said sleeve upon said casing comprising a spring normally urging said sleeve to one position upon said casing.

4. In combination with an oil well derrick, and pipe elevating mechanism associated therewith, a tape attaching member, means mounting said tape attaching member upon said elevator for sliding longitudinally therealong, said tape attaching member having a lateral extension thereon, and means for guiding the lateral extension through a rotatory action as it moves along the elevator mechanism and in such relation that it may engage the top edge of a section of pipe supported by the elevator mechanism to position the zero delineation of the tape flush with the top edge of said pipe section.

5. In combination with an oil well derrick, and pipe elevating mechanism associated therewith, a tape attaching member, means mounting said tape attaching member upon said elevator for sliding longitudinally therealong, said tape attaching member having a lateral extension thereon, and means for guiding the lateral extension through a rotatory action as it moves along the elevator mechanism and in such relation that it may engage the top edge of a section of pipe supported by the elevator mechanism to position the zero delineation of the tape flush with the top edge of said pipe section, and spring means associated with said lateral extension for moving it normally to an out of the way position with respect to said pipe section.

6. Apparatus for measuring the lengths of tubing supported by a derrick elevator mechanism, comprising an elongated tube-like supporting frame having a spiral slot extending longitudinally thereof opening externally thereupon, a sleeve slidable upon said tube, said sleeve having a pin thereon sliding in said spiral slot so that the sleeve will rotate as it slides along said sleeve, spring means under tension in said tube connected with said pin whereby to movably position the sleeve in one location upon said tube, and means laterally extending from said sleeve having means for detachably connecting a measuring tape thereto.

7. In combination with an oil well derrick including elevator mechanism for supporting sections of a string of tubing, a measuring tape, an elongated support connected with the elevator mechanism in substantially upright position, said elongated support having an external spiral groove extending longitudinally thereof, a sleeve slidable along said support having a keyed engagement with said slot whereby the sleeve will rotate as it moves along said support, said sleeve having a lateral extension which swings as the sleeve slides along the support to engage the top edge of a length of tubing held by said elevator mechanism, spring means associated with said sleeve and its support for normally moving the lateral extension out of interfering engagement with the tubing and elevator mechanism, and means to detachably connect the upper end of the measuring tape to said lateral extension.

MEARL L. BARNHART.

References Cited in the file of this patent

UNITED STATES PATENTS

| Number | Name | Date |
|---|---|---|
| 1,003,626 | Malcolm | Sept. 19, 1911 |
| 2,096,600 | Vandervoort | Oct. 19, 1937 |
| 2,342,234 | Abegg | Feb. 22, 1944 |
| 2,544,908 | Winston | Mar. 13, 1951 |